United States Patent Office 3,756,956
Patented Sept. 4, 1973

3,756,956
DEICER COMPOSITION
Erwin Panusch, Livermore, Calif., assignor to Kaiser Aluminum & Chemical Corporation, Oakland, Calif.
No Drawing. Continuation-in-part of abandoned application Ser. No. 84,156, Oct. 26, 1970. This application Jan. 17, 1972, Ser. No. 218,573
Int. Cl. C09k 3/18
U.S. Cl. 252—70
1 Claim

ABSTRACT OF THE DISCLOSURE

The present invention is based on the discovery that a combination of a higher fatty acid or water-soluble salt thereof, or with either a sulfonated higher fatty acid, or water-soluble salt thereof, or an organic phosphate ester surfactant minimizes the corrosive effect of aqueous solutions of formamide, urea or mixtures thereof. This alvantage has been especially noted when the mixture is used as an anticorrosive agent in deicer compositions consisting essentially of formamide, urea and water.

CROSS REFERENCE

This application is a continuation-in-part application of my copending application entitled, "Deicer Composition," Ser. No. 84,156, filed Oct. 26, 1970 and now abandoned.

BACKGROUND OF THE INVENTION

There has been considerable interest in recent years of finding new compositions which can be used as a deicer for the removal of snow and/or ice. A variety of organic compounds have been tested for this purpose, and the search has been directed largely to those organic compounds which have low molecular weight, such as urea, formamide, low molecular weight alcohols and glycols. In U.S. Pat. 3,108,075, which issued on Oct. 22, 1963, various formamide mixtures have been disclosed as effective deicing materials. A particularly effective composition is one consisting essentially of 75% formamide, 20% urea and 5% water by weight. Although these materials are considerably less corrosive than inorganic salts, such as sodium chloride or calcium chloride, they have caused undesirable corrosion of iron or steel. When they are used to remove ice or snow from bridges, iron reinforced concrete or other iron or steel structures, the resultant aqueous solutions cause the metal to corrode. This is at least partially due to presence of small amounts of inorganic salts on or in the surfaces that are treated.

SUMMARY OF THE INVENTION

I have discovered that the corrosive activity of aqueous solutions containing urea, formamide or mixtures thereof as deicing agents can be significantly reduced by using as an anticorrosive agent a mixture consisting essentially of a higher fatty acid, i.e., one having from 10–20 carbon atoms, or a water-soluble salt of said acid, with either a sulfonated higher fatty acid, a water-soluble salt of said sulfonated acid, or a mono- or diester phosphate of hydroxyl terminated ethoxylated or propoxylated fatty alcohol, wherein the fatty alcohol has from about 10 to about 20 carbon atoms having surfactant characteristics. Concentrations of the anticorrosive agent preferably will be used in the range of 0.1% to 2% by weight of the organic component. The effect of the anticorrosive agent below 0.1% concentration will necessarily diminish and although more than 2% may be used, the increased use will be uneconomical because there is not a corresponding decrease in the corrosive activity.

DETAILED DESCRIPTION

I have discovered that certain combinations of agents have a significantly greater anticorrosive effect than the individual agents when incorporated into aqueous solutions of urea, formamide or mixtures thereof. A mixture of a higher fatty acid, i.e., an acid having from about 10 to about 20 carbon atoms, or an alkali or ammonium salt of said acid with either a sulfonated higher fatty acid, an alkali or ammonium salt of said sulfonated acid, or an organic phosphate ester surfactant material is very effective in reducing the corrosive activity of aqueous solutions of organic deicers, such as formamide and urea. For some unknown reason, when the two components are used, the anticorrosivity of the mixtures are considerably better than that of the individual components when used at the same concentrations.

In general, I have found that each of the two components preferably constitutes 20–80% of the mixture of anticorrosive agents. Particularly effective results are obtained when each of the components is present at concentrations of 40–60%.

The anticorrosive mixture is mixed with urea or formamide or mixtures thereof at a concentration adequate to provide the desired anticorrosive effect. When used at concentrations from 0.1% to 2% by weight based on the weight of the organic deicer component, the corrosivity of the organic deicer material is significantly reduced. At concentrations below 0.1%, the effectiveness of the mixture is gradually diminished and at concentrations above 2%, the mixture is still effective in reducing corrosivity, but it is not noticeably more effective than at the 2% level.

The higher fatty acids are those which have from about 10 to about 20 carbon atoms, preferably 16 or 18. Particularly useful salts thereof are those in which the cation is selected from sodium, potassium or ammonium. I have found that sodium or potassium salts of oleic acid are very effective. These compounds correspond to the formula:

wherein R is an alkyl radical having from about 10 to about 20 carbon atoms and X is H, Na, K, or $NH_4$.

The sulfonated higher fatty acids and salts thereof correspond to the following general formula:

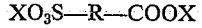

wherein X is hydrogen, $NH_4$, K or Na, preferably potassium or sodium, and R is an alkyl radical having from about 9 to 19 carbon atoms, preferably 13 to 15.

The organic phosphate esters useful in the present invention correspond to the following formula:

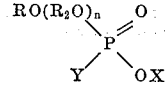

wherein Y is OX or $RO(R_2O)_n$, R is an alkyl radical having from about 10 to about 20 carbon atoms, preferably 14 to 16 carbon atoms, $n$ is a number from 1 to about 10 and X is H, Na, K or $NH_4$; $R_2O$ may be either $CH_2CH_2O$ or $CH_2CH_2CH_2O$, but the ethoxylated compounds are preferred. The alkoxylated compounds are generally used as mixtures, and $n$ is frequently a mixed number such as 1.8. Even when $n$ is an integer, it usually represents an average, e.g., 6 may be an average of compounds in which $n$ individually is 4 to 8.

The alkyl radicals in the various components of the anticorrosive agent may be straight chain or branched chain. The straight chain components are preferred because they are more readily biodegradable.

The deicer compositions of the present invention are particularly effective in aqueous solutions of formamide and urea, especially those containing as deicing agent approximately 50 to approximately 95% formamide and approximately 5 to approximately 50% urea. The amount of water will preferably be as little as necessary to provide a solution of urea in formamide or to adjust the viscosity of the deicing agent. It may, however, be increased so long as the final solution still has deicing properties under the conditions of use. If the temperature of application is close to 32° F., the amount of water may constitute in excess of 50% of the composition. As a practical matter, 3 to 12% by weight water is desirable. In particular, I have found that the addition of a small but effective amount of the anticorrosive mixture to a composition consisting of approximately 75% formamide, approximately 20% urea and approximately 5% water is especially useful in reducing the corrosivity of that composition when used as a deicer.

The compositions may be non-aqueous when applied. As the snow or ice melts, the aqueous solutions are formed and the deicing agent is gradually diluted. It is preferred to apply the deicing agents in an aqueous medium because it may then be sprayed on to the surface with greater facility and the liquid form will produce a more rapid effect on the ice or snow.

In addition to the removal of ice or snow by application of these deicer compositions, they may also be used to prevent formation of ice or accumulation of snow on a surface. If the compositions of the invention are applied to a surface prior to a sleet or snow storm, it will react with the precipitation and cause it to melt. Depending on the rate of application and the amount of precipitation, residual deicer composition may be effective for more than one storm.

Application of the presently claimed compositions is most effective on surfaces that are substantially horizontal, such as roads, bridges, landing and taxi strips. As the surface approaches a right angle to the ground, runoff of material increases to the point where economics may preclude use of these materials.

The following examples are submitted as illustrative of the invention which is not limited to the particular embodiments disclosed therein.

Example 1

The following compositions were prepared by mixing the ingredients shown below, the percentages therein being by weight:

|  | A | B | C | D | E | F | G |
|---|---|---|---|---|---|---|---|
| Formamide | 75 | 75 | 75 | 75 | 75 | 75 | 75 |
| Urea | 20 | 19 | 19 | 19 | 19 | 19 | 19 |
| Water, deionized | 100 | 5 | 5 | 5 | 5 | 5 | 5 |
| Sodium oleate |  |  | 0.4 | 0.4 |  |  | 1 |
| Sulfonate [1] |  |  | 0.6 |  | 1 |  |  |
| Phosphate [2] |  |  |  | 0.6 |  | 1 |  |

[1] Sodium slat of the true sulfonate of oleic acid.
[2] A mono-ester of the formula on page 4 in which R is a mixture $CH_3(CH_2)_{14-16}$, $n$ is an average of 6 and each X is H.

Example 2

Each of the above compositions, except A, was diluted to 10% solutions in deionized water (Column 1) or saturated lime water (Column 2) and 0.1% by weight sodium chloride added to the dilute solutions. The corrosion rate was then determined with a Magna Corrosometer® of the Magna Corporation, cf. Bulletin No. 724 of said corporation. In the following table, the corrosion rates are in mils per year:

|  | 1 | 2 |
|---|---|---|
| A | 4.3 |  |
| B |  | 22.4, 26.4 |
| C | 3.8, 2.0, 2.0, 2.1 | 2.3, 1.1, 2.0, 1.9, 1.9 |
| D | 2.1, 0.7, 3.7, 1.2 | 1.3, 0.7, 0.4, 0.6 |
| E | 8.7, 4.6 | 5.1 |
| F | 12.5 | 3.8 |
| G | 6.0, 6.9 |  |

The individual active components of the anticorrosive agents employed herein will generally be mixtures rather than chemically pure specific members of the group. For example, the fatty acid may be an alkali salt of coconut oil, which contains a number of higher fatty acids. Also, the sulfonate agents and the phosphate agents may be mixtures of those groups.

It is also recognized that other materials may be added to the deicer compositions without adversely affecting the anticorrosive nature thereof. For example, other deicers, such as acetamide, glycols or alcohols, may be incorporated, as well as dyes, denitrification agents, chelating agents, etc.

What is claimed is:
1. An aqueous deicing composition consisting essentially of from about 60% to about 85% formamide, about 12% to about 30% urea, about 3% to about 12% water and an anticorrosive agent in an amount equivalent to 0.1% to 2% by weight of the organic component of the deicing composition, the agent consisting essentially of a mixture of (a) sodium oleate and (b) the sodium salt of sulfonated oleic acid, the mixture of (a) and (b) containing 40% of (a) and 60% of (b).

References Cited
UNITED STATES PATENTS

| 1,613,808 | 4/1926 | Schreiber | 252—389 |
| 2,060,138 | 11/1936 | Taylor | 252—389 X |
| 2,102,825 | 12/1937 | Woodhouse et al. | 252—389 X |
| 3,108,075 | 10/1963 | Hearst | 252—70 |
| 3,297,577 | 1/1967 | Standish et al. | 252—70 |

OTHER REFERENCES

McCutcheon: ed., Detergents and Emulsifiers, 1969 Annual, p. 238.

HERBERT B. GUYNN, Primary Examiner

H. A. PITLICK, Assistant Examiner

U.S. Cl. X.R.
252—389, 395, 396